United States Patent [19]

Gross

[11] 4,253,990

[45] Mar. 3, 1981

[54] PREPARATION METHOD FOR CATALYST SUPPORTS AND MATERIALS PRODUCED THEREBY

[75] Inventor: Stephen E. Gross, Littleton, Colo.

[73] Assignee: Johns-Manville Corporation, Denver, Colo.

[21] Appl. No.: 74,284

[22] Filed: Sep. 11, 1979

[51] Int. Cl.³ .............................................. B01J 21/12
[52] U.S. Cl. ................................................ 252/455 R
[58] Field of Search .................................. 252/455 R

[56] References Cited

U.S. PATENT DOCUMENTS

| | | | |
|---|---|---|---|
| 2,283,174 | 5/1942 | Bates et al. | 252/449 |
| 3,526,602 | 9/1970 | Kobayashi et al. | 252/449 X |

*Primary Examiner*—W. J. Shine
*Attorney, Agent, or Firm*—Robert M. Krone; Joseph J. Kelly; James W. McClain

[57] ABSTRACT

A method of preparation of catalyst supports is disclosed as well as supports made by the method. Natural diatomite, bentonite clay, silica, cellulose fiber, corn meal and water are mixed, extruded, pelleted, dried and calcined to form porous catalyst supports pellets comprising fused natural diatomite, bentonite clay and silica.

20 Claims, No Drawings

PREPARATION METHOD FOR CATALYST SUPPORTS AND MATERIALS PRODUCED THEREBY

TECHNICAL FIELD

The invention herein relates to a method for producing catalyst supports, and the catalyst supports produced by such method.

BACKGROUND OF PRIOR ART

Catalyst supports are widely used in the various chemical industries. Such supports are normally highly porous pellets composed primarily of silica or mixtures of silica and alumina. The porous nature of the pellets give them considerable surface area. On the surfaces are deposited small amounts of catalytically active materials, such as metals or acids. Use of the support with a catalytically active material greatly increases the efficiency of use of the latter, for by spreading the material over a large support surface area much more of its catalytically active surface is exposed to the chemicals whose reaction it is to catalyze.

The precise nature of the catalyst support will depend on the particular catalytic reaction for which it is to be used. Thus there are many significant differences in the preparation processes with different catalyst supports so that parameters such as pore size and effective surface area can be controlled.

BRIEF SUMMARY OF THE INVENTION

The invention herein is a process for the formation of a siliceous catalyst support which comprises:

a. forming a mixture comprising, in parts by weight:
natural diatomite—8 to 12 parts
bentonite clay—4 to 6 parts
silica—4 to 6 parts
cellulose fiber—1.5 to 2.5 parts
corn meal—1.5 to 2.5 parts
and sufficient water to impart an extrudable consistency;

b. extruding the mixture through a die to form an extrudate and then separating the extrudate into a plurality of pellets;

c. drying the pellets for at least 30 minutes at a temperature of at least 180° F. (80° C.), with the time and temperature being selected such that the corn meal and cellulose fiber are substantially completely dried; and d. calcining the dried pellets at a temperature of at least about 1200° F. (650° C.) for at least about 30 minutes, until the corn meal and cellulose fiber are substantially completely removed from the pellets leaving a highly porous solid composite pellet of natural diatomite, bentonite clay and silica.

DETAILED DESCRIPTION OF THE INVENTION

The invention herein resides in a process for the formation of a catalyst support from a mixture of raw materials comprising six components: natural diatomite, bentonite clay, silica, cellulose fiber, corn meal and water.

Natural diatomite is a highly siliceous material composed of the remains of microscopic plants, which remains have over the centuries become collected in large deposits where ancient bodies of water once existed. Typical natural diatomites are composited of approximately 80 to 90% by weight of silica, 1 to 10% by weight of iron oxides and aluminum oxides and smaller amounts of materials such as calcium oxide, magnesium oxide and alkaline metal oxides. Diatomites are normally "produced" by being mined, crushed and graded to different particle sizes. The natural diatomites commonly have lower silica contents than calcined or flux calcined diatomites. Natural diatomites of the type suitable for use in the present invention are available commercially from Johns-Manville Corporation under the trademark FILTER-CEL. In this invention the natural diatomite component will be present in the raw materials mixture in an amount of from 8 to 12 parts by weight, preferably about 9.5 to 10.5 parts by weight. In particular, the amount of natural diatomite in the initial mixture will be chosen such that following the calcining and removal of the cellulose fiber and corn meal, the resulting catalyst support will be composed of approximately 45% to 55% by weight of natural diatomite, 20% to 30% by weight of bentonite clay and 20% to 30% by weight of silica.

The second component of the raw material mixture is bentonite clay, a form of montmorillonite clay. Bentonite clays are hydrous aluminum silicates normally containing significant portions of sodium, magnesium and calcium oxides. Such clays are described in Dana, *Textbook of Mineralogy* (1932). In the present invention the bentonite clay will be present as from 4 to 6 parts by weight of the raw material mixture, preferably about 4.5 to 5.5 parts by weight. The amount in the raw material mixture will be chosen in order to obtain the final bentonite content in the calcined pellets as described above.

The third component of the invention is a high purity siliceous material comprising 95% or more of silica. This material is present in the composition to increase the surface area in the final product and to dilute metal impurities which are present from the natural diatomite and the bentonite clay. Normally the silica component will be a precipitated silica product having particle sizes in the range of from 0.1 to 10 μm. Typical of the materials which may be used are those sold under the trademark "HiSil 233" by PPG Corporation. The silica will be present in the raw materials mix as 4 to 6 parts by weight, preferably 4.5 to 5.5 parts by weight. These quantities will be chosen so as to obtain the desired final amount of silica in the calcined product as described above.

Another component of the invention is cellulose fiber. This may be any common cellulose fiber material such as kraft fiber, wood fiber, straw fiber and the like that is a well opened fiber. Short fiber lengths are preferred for ease in mixing and extruding. The cellulose fiber component will be present in the raw materials mixture as 1.5 to 2.5 parts by weight, preferably 1.75 to 2.25 parts by weight of the composition.

Also present in the composition is corn meal. Normally the corn meal used in the present invention will be a polenta grade or equivalent food grade. Lesser grades, such as animal feed grades, are normally found to contain too much residual corn husk, which leads to difficulties in the subsequent extrusion of the raw material mixture. The corn meal component of the present raw material mixture will be in the range of from 1.5 to 2.5 parts by weight, preferably 1.75 to 2.25 parts by weight of the composition.

The final component of the raw material mixture is water in a sufficient amount to cause the mixture of the solid components to take on an extrudable consistency.

It will normally be well within the skill of one versed in the art to determine the appropriate amount of water to be added to the dry solids to form a readily extrudable material in the particular type of extrusion equipment being used. In experiments run for the present invention, it has been found that satisfactorily extrudable mixtures can be formed with approximately 0.5 pounds of water per pound of dry solids. Generally the ratio of water to dry solids should be approximately about 0.4 to 0.6 parts by weight of water per part by weight of dry solids. The same experiments have indicated that approximately 10 to 25 minutes of mixing of the water and dry solids and preferably about 15 to 20 minutes of mixing have yielded entirely satisfactory extrudable mixtures.

After the mixture of the solid materials and water is formed into the extrusion feed, it is extruded in conventional extrusion equipment through a die to form an extrudate from which individual pellets may be separated. It is frequently desirable to incorporate a lubricant or similar extrusion aid into the mixture to facilitate the extrusion; such material will be burned out of the product during the subsequent drying and/or calcining. Most commonly the extrudate is an elongated rod-like material of circular, oval or square cross-section. Circular cross-sections are preferred to minimize attrition of the pellets in subsequent handling. Normally the extruded rod is approximately 0.10 inch to 0.15 inch (approximately 2.5 to 3.8 millimeters) in width or diameter, and preferably approximately 0.115 to 0.135 inches (approximately 2.9 to 3.4 millimeters). The extruded rod is commonly severed at intervals approximately equal to the diameter or width of the rod such that generally cylindrical or cubical pellets having approximately equal dimensions in all directions are formed. Conventional severing equipment such as wire knives can be used.

After the extruded pellets are formed they are dried in conventional drying units such as continuous belt dryers. Quite satisfactory materials have been made using a three zone dryer in which temperature ranges between about 180° F. (80° C.) and 320° F. (160° C.), although temperatures may be as high as about 400° F. (200° C.) if desired. Drying will be for at least 20 minutes and preferably on the order of about 25 to 35 minutes. The time and temperature relationships must be such that during the drying period all moisture is removed. After drying has been completed the pellets may be allowed to cool and are screened to remove any pellets which are over or under the desired size range.

Thereafter the dried pellets are calcined or fired in calcining equipment such as a rotary kiln at a temperature of at least about 1200° F. (650° C.) for at least about 30 minutes. Calcining may be at temperatures as high as 1300° F. (700° C.) but will preferably be at temperatures on the order of about 1225° F. (660° C.) to 1275° F. (690° C.). The calcining time will be at least 30 minutes and will normally be on the order of about 40 to 50 minutes. Calcining in an oxygen containing atmosphere should continue until all the corn meal and cellulose fiber in the dried pellets has been burned out of the pellets leaving a highly porous solid composite of fused diatomite clay and silica. If desired, additional air injection can be used at approximately the mid-point of the calcination kiln to enhance the calcination; an air lance is quite suitable for such air injection. Following calcining the catalyst support pellets are screened to remove over and under sized pellets and then weighed into containers such as bags for shipping.

As a specific example of this invention, catalyst supports have been made by first mixing the following raw materials to an extrudable consistency:
  natural diatomite (the aforesaid "FILTER-CEL" diatomite from Johns-Manville Corp.)—42 parts
  bentonite clay—21 parts
  silica (the aforesaid "HiSil 233" silica from PPG Corp.)—21 parts
  cellulose fiber—8 parts
  corn meal (polenta grade)—8 parts
  water sufficient to impart extrudable consistency These materials were mixed for about 20 minutes, milled in a pug mill, and then fed to an extruder where the mixture was extruded through a 4 inch (10 cm) circular dye. The extruded rod was cut at 3/16 inch (4.8 mm) intervals into pellets. These pellets were then dried at about 180° F. (80° C.) to 320° F. (160° C.) for a period of about 30 minutes, and were thereafter calcined and screened. Calcining temperature was maintained at about 1200° F. (650° C.) and the pellets were calcined for about 45 minutes. The pellets were then screened to remove off-size material.

STATEMENT OF INDUSTRIAL APPLICATION

The catalyst supports herein find use in a wide variety of industrial catalytic chemical reactions. In one process they are acid leached to remove metal contaminants and then impregnated with phosphoric acid. The supported phosphoric acid catalyst is then used in the catalytic conversion of ethylene to ethanol.

I claim:
1. A process for the formation of a siliceous catalyst support which comprises:
   a. forming a mixture comprising, in parts by weight:
      natural diatomite—8 to 12 parts
      bentonite clay—4 to 6 parts
      silica—4 to 6 parts
      cellulose fiber—1.5 to 2.5 parts
      corn meal—1.5 to 2.5 parts
   and sufficient water to impart an extrudable consistency;
   b. extruding the mixture through a die to form an extrudate and then separating the extrudate into a plurality of pellets;
   c. drying the pellets for at least 20 minutes at a temperature of at least 180° F., with the time and temperature being selected such that the corn meal and cellulose fiber are substantially completely dried; and
   d. calcining the dried pellets at a temperature of at least about 1200° F. for at least about 30 minutes, until the corn meal and cellulose fiber are substantially completely removed from the pellets leaving a highly porous solid composite pellet of natural diatomite, bentonite clay and silica.

2. A process as in claim 1 wherein said mixture contains 9.5 to 10.5 parts by weight of said natural diatomite.

3. A process as in claim 1 wherein said mixture contains 4.5 to 5.5 parts by weight of said bentonite clay.

4. A process as in claim 1 wherein said mixture contains 4.5 to 5.5 parts by weight of said silica.

5. A process as in claim 1 wherein said mixture contains 1.75 to 2.25 parts by weight of said cellulose fiber.

6. A process as in claim 1 wherein said mixture contains 1.75 to 2.25 parts by weight of said corn meal.

7. A process as in claim 6 wherein said corn meal is a polenta or equivalent food grade.

8. A process as in claims 1, 2, 3, 4, 5 or 6 wherein said mixture contains 0.4 to 0.6 parts by weight of water per part by weight of dry solids.

9. A process as in claim 1 wherein said drying is conducted at a temperature in the range of from about 180° F. to about 400° F.

10. A process as in claim 9 wherein said temperature is in the range of from about 180° F. to about 320° F.

11. A process as in claims 9 or 10 wherein said drying is conducted for a period of from about 25 to about 35 minutes.

12. A process as in claims 1, 9 or 10 wherein said calcining is conducted at a temperature in the range of from about 1200° F. to about 1300° F.

13. A process as in claim 12 wherein said temperature is in the range of from about 1225° F. to about 1275° F.

14. A process as in claim 12 wherein said calcining is conducted for a period of from about 40 to about 50 minutes.

15. A process as in claim 13 wherein said calcining is conducted for a period of from about 40 to about 50 minutes.

16. A siliceous catalyst support article made by a process as in claims 1, 2, 3, 4, 5 or 6.

17. An article as in claim 16 and comprising 45% to 55% by weight of natural diatomite, 20% to 30% by weight of bentonite clay and 20% to 30% by weight of silica.

18. An article as in claim 17 having deposited on the surface thereof at least one catalytically active substance.

19. An article as in claim 18 wherein said substance is a metallic element.

20. An article as in claim 18 wherein said substance is an acid.

* * * * *